Figure 1:
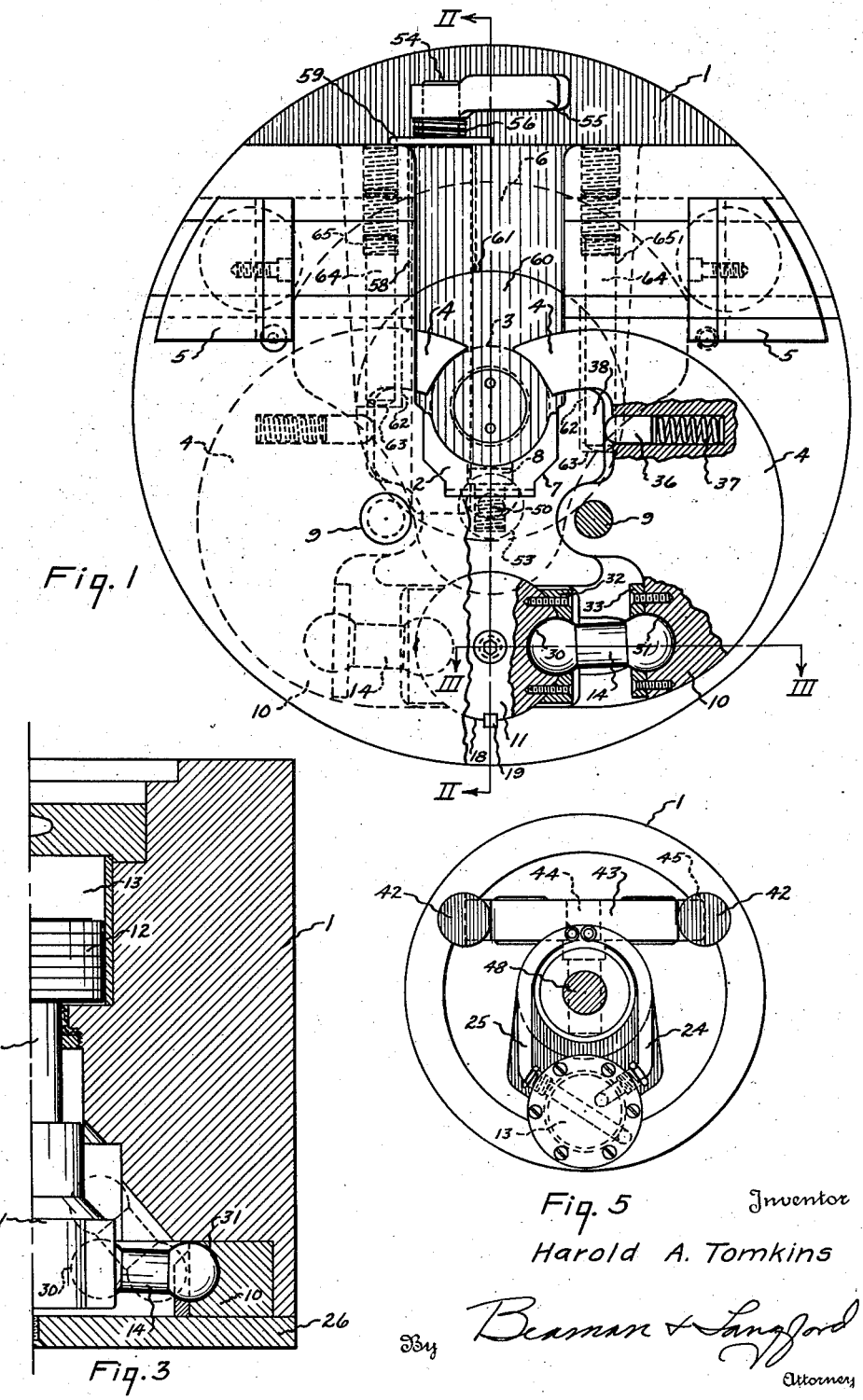

Jan. 5, 1937.   H. A. TOMKINS   2,067,107
CRANKSHAFT CHUCK
Filed Feb. 23, 1935   2 Sheets-Sheet 2
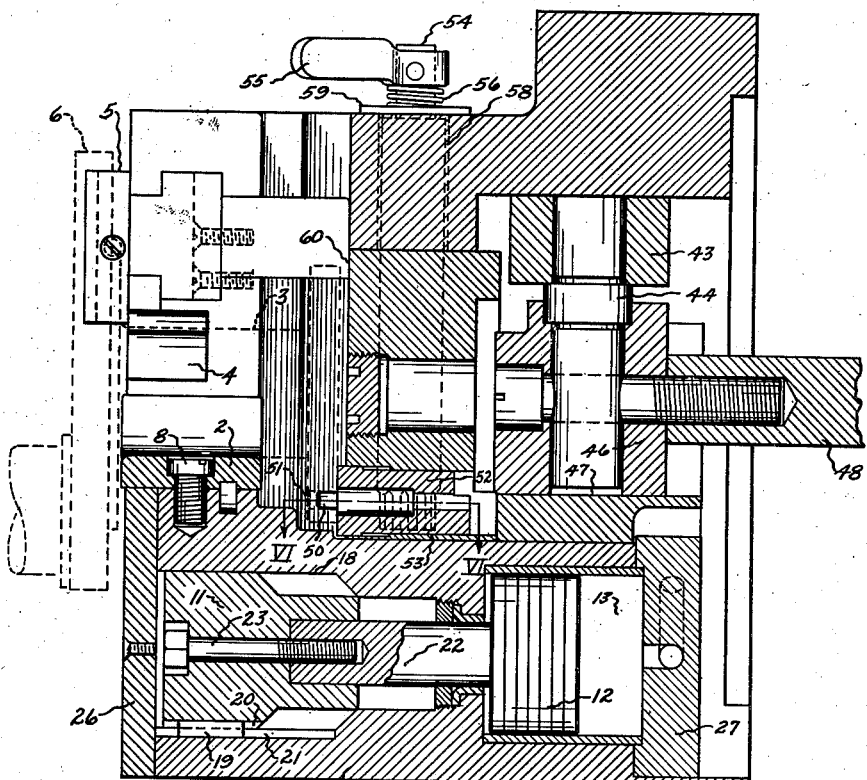
Fig. 2
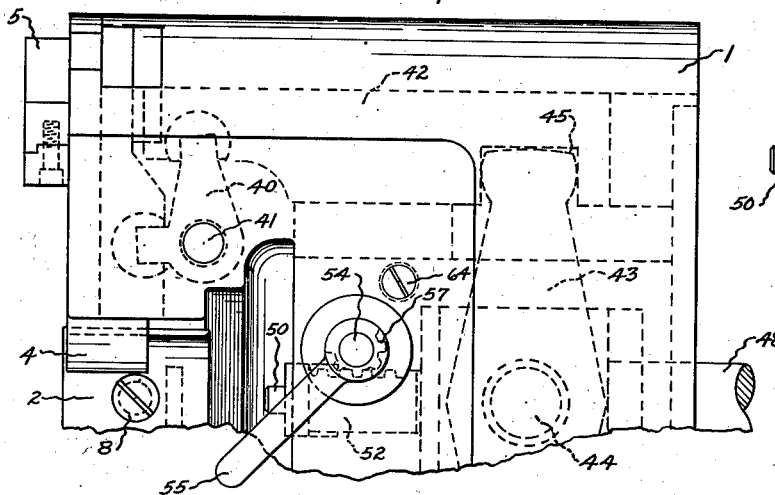
Fig. 4
Fig. 6
Inventor
Harold A. Tomkins
By Beaman & Langford
Attorney Patented Jan. 5, 1937

2,067,107

UNITED STATES PATENT OFFICE 2,067,107

CRANKSHAFT CHUCK

Harold A. Tomkins, Jackson, Mich.

Application February 23, 1935, Serial No. 7,828

18 Claims. (Cl. 82—40)

This invention relates to crank shaft chucks and more particularly to the self-equalizing fluid actuated or pneumatic type for supporting crank shafts in machine tools.

Many forms of chucks of the above type have been devised but, principally due to the self-equalizing features they lack the necessary degree of positive actuation and the positive centering facilities which are necessary in order to obtain accurate work over long periods of time. An example of the prior are is shown by my Patent Number 1,938,409 on which this invention is an improvement.

An object of this invention is to provide a chuck overcoming the above difficulties in which a crank shaft can be positively centered and maintained against accidental displacement.

Another object of this invention is to provide a device in a chuck for positively aligning a crank shaft therein.

A further object is to provide a chuck having a novel arrangement and combination of its parts for definitely and rigidly positioning crank shafts so that they will not be displaced during the equalizing action of the jaws.

These and other objects will be apparent from the following specification when taken with the accompanying drawings in which Fig. 1 is an end elevation, partially broken away, of the chuck according to this invention showing the position of the crank shaft as clamped therein in dotted outline, Fig. 2 is a section on the line II—II of Fig. 1 also showing the crank shaft in dotted outline, Fig. 3 is a section on the line III—III of Fig. 1 showing a portion of the toggle mechanism and a journal clamping jaw in clamping position and a toggle lever in dotted outline in nonclamping position, Fig. 4 is a partial plan view of Fig. 1 showing the construction of the equalizing jaws for clamping the crank shaft counterbalancing weight, Fig. 5 is an elevation of the end of the chuck opposite that of Fig. 1 in reduced scale, and Fig. 6 is a detail of the aligning pin for fixing the angular position of the crank shaft in the chuck and is a section on the line VI—VI of Fig. 2.

Referring to the drawings the reference character 1 indicates the outer housing of the chuck. The chuck comprises broadly a cradle 2 in which the journal 3 of the crank shaft is disposed, jaws 4 for clamping the journal 3 in the cradle 2 and jaws 5 for clamping the counterbalancing weight 6 of the crank shaft.

The cradle 2 is received in a recess 7 in the body 1 and is maintained therein by a bolt 8. The removability of the cradle 2 makes possible its replacement in the case of wear or when adapting the chuck for different size crank shafts. The jaws 4 for clamping the journal in the cradle are pivoted for opposed movement about pins 9 and have tail pieces 10 on which the motive portion of the clamping mechanism operates.

The motive portion of the clamping mechanism comprises a toggle block 11 axially movable by a piston 12 in the cylinder 13, and toggle links 14. The toggle block 11 is slidably mounted in the slideway 18 and is maintained against rotative movement by the key 19 disposed in the keyways 20 and 21 in the toggle block 11 and the body 1, respectively. The toggle block 11 is telescopically connected to the piston rod 22 of the piston 12 and is secured to the piston rod 22 by the bolt 23.

Fluid pressure, usually compressed air, is employed to operate the piston 12 and is conducted to opposite ends thereof in the cylinder 13 by connections 24 and 25 shown particularly in Fig. 5. Suitable and known controlling valves, not shown, are employed to control the fluid pressure to the opposite ends of the cylinder 13 to operate the journal clamping jaws 4. It will thus be obvious that by moving the piston 12 forwardly or rearwardly by fluid pressure, the toggle block 11 correspondingly may be moved forwardly or rearwardly. The toggle block slideway 18 and the cylinder 13 are both closed by suitable heads 26 and 27, respectively.

The toggle links 14 are ball headed at each end, the balls being disposed in sockets 30 and 31, respectively, in the toggle block 11 and in the tail pieces 10 of the journal clamping jaws 4. The sockets 30 and 31 are in part formed by retaining plates 32 and 33. In normal nonclamping position of the journal clamping jaws 4, the toggle links 14 assume an angular position with respect to the direction of movement of the toggle block 11 as shown by the dotted lines in Fig. 3. Upon forward clamping movement of the toggle block 11 due to an impulse initiated by admitting pressure fluid to the cylinder 13 behind the piston 12, the inner ends of the toggle links 14 are moved in the direction of movement of the block 11 until they are substantially perpendicular thereto. In this position the toggle is straightened out with the result that the jaws 4 are pivoted about the pins 9 in the body 1, and into clamping engagement with the journal 3 of the crank shaft. The jaws remain in clamping position until the fluid pressure is released from the cylinder 13 behind the piston 12 and fluid pressure is admitted in front of the piston 12. Movement of the jaws 4 from clamping position, upon the proper actuation of the piston, is insured by pins 36 mounted in the jaws 4, and urged by springs 37 against shoulders 38 which are part of the body 1. It will be apparent, of course, that during clamping movement of the jaws 4 the pins 36 are forced inwardly against the action of the springs 37.

The foregoing describes the mechanism for clamping the journal 3 of the crank shaft against the cradle 2. However, due to the cylindrical configuration of the journal 3 further clamping is necessary in order to rigidly secure the crank shaft for being worked on.

In the present structure self centering jaws 5 are moved inwardly against the counterbalancing weight 6 of the crank shaft. The mechanism for actuating the jaws 5 is like that disclosed in my prior Patent No. 1,869,445. Each jaw 5 is slidable in a direction perpendicular to a line parallel to the axis of the crank shaft when in clamping position and is connected through a bell crank lever 40 pivoted at 41 to an axially slidable rod 42 so that axial movement of the rods 42 results, due to the action of the bell crank levers 40, in clamping or unclamping movement of the jaws 5. Axial movement is imparted to the rods 42 by an equalizing bar 43 mounted on and oscillatable on a vertical pin 44 and having its ends in slots 45 in the rods 42. The pin 44 is mounted in the block 46 slidable on the ledge 47 in the body 1. The block 46 is moved carrying with it the pin 44 and the equalizing bar 43, by the connecting rod 48 which in turn is driven by a pressure fluid operated piston, not shown, in the usual and well known manner. The counterbalancing weight clamping jaws 5 need not be operated as shown but may be operated by any suitable mechanism which may be found desirable.

In order to maintain the crank shaft against accidental rotary displacement and to align it preparatory to actual clamping a pin 50 in the chuck body 1 is made to engage with a bore 51 in the chucked end of the crank shaft. According to the present invention the flange end of the crank shaft is clamped in the chuck. Accordingly the bore 51 is located at a predetermined point in the flange. The pin 50 is axially movable, being press fitted in a cylindrical rack 52 axially slidable in a bore 53. Axial adjustment of the rack 52 and consequently the pin 50 is accomplished by means of the vertical rod 54 having a pinion 57 at its lower end engageable with the rack 52. The rod 54 loosely passes through a bore 58 in the body 1. Rotary movement is imparted to the vertical rod 54 by the manually operable handle 55 and its adjusted position is maintained by the helical spring 56 disposed on the rod 54 bearing against a washer 59 on the top of the chuck body 1, and the handle 55.

Accurate positioning of the crank shaft by the engagement of the pin 50 with the bore 51 is provided for by making the pin 50 adjustable about an arc of a circle. This adjustment is made possible by locating the rack bore 53 in an oscillatable cylindrical block 60 slidably oscillatable in a bore 61 in the body 1 (see Fig. 1).

In each side of the cylindrical block 60 is a recess 62 having a shoulder 63 against which adjusting screws 64, threaded in bores 65 in the body 1 abut. Thus upon taking up on one of the screws 64 and loosening the other, or vice versa, the cylindrical block 60 may be oscillated as desired to accurately position the pin 50. The rod 54 snugly fits in the block 60 but its loose fit in the bore 58 permits the oscillatory adjustment.

The piston 12 controlling the journal clamping jaws 4 and the piston, not shown, to which the connecting rod 48 is connected operating the counterbalancing weight clamping jaws 5, preferably are operated by pressure fluid from the same source and controlled by the same valves so that the jaws 4 and 5 are moved by a single operation simultaneously into and out of clamping position.

The advantage of the chuck according to this invention is that each crank shaft is identically aligned and once clamped can not alter its position, with the result that accurate machining may be done and each machined crank shaft is an exact duplication of each other one.

The foregoing description is illustrative only of my invention and I therefore do not wish to be limited except by the scope of the following claims.

I claim:

1. In a device of the character described the combination of a chuck body having a plurality of pairs of clamping jaws, operating mechanisms for said jaws, means adjustably mounted in said body for movement into engagement with the work in said device arranged for rotatively aligning the same and means for actuating said mechanisms.

2. In a device of the character described the combination of a chuck body having a work receiving and supporting cradle, a pair of jaws for clamping a piece of work in said cradle, pivots on which said jaws are mounted, a tail piece on each jaw, means to operate said jaws, said means comprising a toggle block, toggle links connecting said tail pieces to said toggle block forming a toggle, and means for actuating said toggle whereby upon the straightening out of said toggle said jaws are rotated about said pivots into clamping position.

3. In a device of the character described the combination of a chuck body having a pair of clamping jaws movable in a single plane, pivots on which said jaws are mounted, a tail piece on each jaw, means to operate said jaws, said means comprising a toggle block, toggle links connecting said tail pieces to said toggle block forming a toggle, said toggle links being mounted for operation in a plane perpendicular to the plane of movement of said jaws, said link connections being of the ball and socket type, and means for actuating said toggle, whereby upon the straightening out of said toggle said jaws are rotated about said pivots into clamping position.

4. In a device of the character described the combination of a chuck body having a work receiving cradle, a pair of jaws for clamping a piece of work in said cradle, pivots on which said jaws are mounted, a tail piece on each jaw, means to operate said jaws, said means comprising a toggle block, toggle links connecting said tail pieces to said toggle block forming a toggle, means for actuating said toggle whereby upon the straightening out of said toggle said jaws are rotated by said pivots into clamping position, and upon collapsing of said toggle the jaws are rotated about said pivot into unclamping position, and means for resiliently urging said jaws into unclamping position, said resiliently urging means comprising a resiliently urged pin disposed in each of said jaws and relatively fixed means on said body against which said pins bear.

5. In a device of the character described the combination of a chuck body having a work receiving cradle, a pair of jaws for clamping a piece of work in said cradle, pivots on which said jaws are mounted, a tail piece for each jaw, means to operate said jaws, said means comprising a toggle block, toggle links connecting said tail pieces to said toggle block forming a toggle, means for actuating said toggle whereby upon the straightening out of said toggle said jaws are rotated about said pivots into clamping position, and a work engaging aligning pin for rotatively aligning said work in said cradle.

6. In a device of the character described the combination of a chuck body having a work receiving cradle, a pair of jaws for clamping a piece of work in said cradle, pivots on which said jaws are mounted, a tail piece for each jaw, means to operate said jaws, said means comprising a toggle block, toggle links connecting said tail pieces to said toggle block forming a toggle, means for actuating said toggle whereby upon straightening out of said toggle said jaws are rotated about said pivots into clamping position, and means adjustably mounted in said body for engaging the work and rotatively aligning the same in said cradle.

7. In a device of the character described the combination of a chuck body having a work receiving cradle, a pair of jaws for clamping a piece of work in said cradle, pivots on which said jaws are mounted, a tail piece for each jaw, means to operate said jaws, said means comprising a toggle block, toggle links connecting said tail piece to said toggle block forming a toggle, means for actuating said toggle whereby upon the straightening out of said toggle said jaws are rotated about said pivots into clamping position, and means adjustably mounted in said body for movement into engagement with the work for rotatively aligning the same in said cradle.

8. A device of the character described comprising a chuck body having a plurality of pairs of clamping jaws, operating mechanisms for said jaws, a pin mounted on said body for axial movement, manually operable means for axially moving the same into engagement with the work in said device for rotatively aligning the same, and means for actuating said mechanisms.

9. In a device of the character described the combination of a chuck body having a plurality of pairs of clamping jaws, operating mechanisms for said jaws, axially movable means defining a rack slidably mounted in said body, a pin supported by said rack for axial movement therewith, means including a pinion operatively engaging said rack for axially moving said pin into engagement with the work in said device for rotatively aligning the same, and means for actuating said mechanisms.

10. In a device of the character described the combination of a chuck body having a work receiving cradle, a pair of pivoted jaws for clamping a piece of work in said cradle, a pin mounted for axial movement in said body for engagement with the work in said cradle arranged for rotatively aligning the same, and means to operate said jaws.

11. In a device of the character described the combination of a chuck body having a work receiving cradle, a pair of pivoted jaws for clamping a piece of work in said cradle, means mounted in said body for movement into engagement with the work in said cradle for rotatively aligning the same, adjustable oscillatable means in which said last named means is mounted, and means to operate said jaws.

12. In a device of the character described the combination of a chuck body having a work receiving cradle, means for clamping a piece of work in said cradle, means mounted in said body for movement into engagement with the work in said cradle for rotatively aligning the same, adjustable oscillatable means in which said last named means is mounted, said adjustable oscillatable means comprising a cylindrical block mounted in said body for oscillation about its axis, shoulders on opposite sides of said block, and means engageable with said shoulders for rotatably adjusting said block about its axis, and means to operate said clamping means.

13. In a device of the character described the combination of a chuck body having a work receiving cradle, a pair of jaws for clamping a piece of work in said cradle, pivots on which said jaws are mounted, a tail piece on each jaw, means to operate said jaws, said means comprising a toggle block, toggle links connecting said tail pieces to said toggle block forming a toggle, means for actuating said toggle whereby upon the straightening out of said toggle said jaws are rotated about said pivots into clamping position, a second pair of clamping jaws mounted for movement toward and away from each other for clamping part of said work therebetween, means to operate said second pair of jaws, and means for controlling said two jaw operating means.

14. In a device of the character described the combination of a chuck body having a work receiving cradle, a pair of jaws for clamping a piece of work in said cradle, pivots on which said jaws are mounted, means to operate said jaws, said means comprising a toggle which upon actuation is straightened out and rotates said jaws about said pivots into clamping position, a second pair of jaws for movement toward and away from each other for clamping the part of said work therebetween, means to operate said second pair of jaws, means for operating said two jaw operating means, and means for rotatively aligning said work in said cradle.

15. In a device of the character described the combination of a chuck body having a work receiving cradle, a pair of jaws for clamping a piece of work in said cradle, means to move said jaws into and out of clamping position, a second pair of jaws for clamping a part of said work, means to move said second pair of jaws into and out of clamping position, means for operating said two jaw moving means, and means for rotatively aligning said work in said cradle.

16. In a device of the character described the combination of a chuck body having a work receiving cradle, a pair of jaws for clamping a piece of work in said cradle, pivots on which said jaws are mounted, a tail piece on each jaw, toggle links connecting said tail pieces to said toggle block forming a toggle, means for actuating said toggle whereby upon the straightening out of said toggle said jaws are rotated about said pivots into clamping position, a second pair of jaws mounted for movement toward and away from each other for clamping part of said work therebetween, means to operate said jaws including an equalizer lever, means for operating said jaw operating means and said toggle actuating means, and an axially movable pin movable into engagement with the work for rotatively aligning the same in said cradle.

17. In a device of the character described the combination of a chuck body having a pair of clamping jaws movable in a single plane, pivots on which said jaws are mounted, a tail piece on each jaw, means to operate said jaws, said means comprising a toggle block, toggle links connecting said tail pieces to said toggle block forming a toggle, said toggle links being mounted for operation in a plane perpendicular to the plane of movement of said jaws, and means for actuating said toggle, whereby upon the straightening out of said toggle said jaws are rotated about said pivots into clamping position.

18. In a device of the character described the combination of a chuck body having a pair of clamping jaws movable in a single plane, pivots on which said jaws are mounted, a tail piece on each jaw, means to operate said jaws, said means comprising a toggle block, toggle links connecting said tail pieces to said toggle block forming a toggle, said toggle links being mounted for operation in a plane at an angle to the plane of movement of said jaws, and means for actuating said toggle, whereby upon the straightening out of said toggle said jaws are rotated about said pivots into clamping position.

HAROLD A. TOMKINS.